US012231990B1

(12) United States Patent
Taylor et al.

(10) Patent No.: US 12,231,990 B1
(45) Date of Patent: Feb. 18, 2025

(54) SYSTEMS AND METHODS FOR FRAUD PREVENTION

(71) Applicant: United Services Automobile Association (USAA), San Antonio, TX (US)

(72) Inventors: Samantha Elizabeth Taylor, Frisco, TX (US); Yogen Rai, Plano, TX (US); Zachery C. Lake, Aubrey, TX (US); Rachel Elizabeth Csabi, Frisco, TX (US); Hollie Ilene King, Frisco, TX (US); Nicholas C. Wheeler, The Colony, TX (US); Victor Kwak, Frisco, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 18/143,283

(22) Filed: May 4, 2023

Related U.S. Application Data

(62) Division of application No. 17/003,721, filed on Aug. 26, 2020, now Pat. No. 11,678,142.

(Continued)

(51) Int. Cl.
*H04W 4/029* (2018.01)
*G06F 21/32* (2013.01)
(Continued)

(52) U.S. Cl.
CPC ............ *H04W 4/029* (2018.02); *G06F 21/32* (2013.01); *G06V 40/166* (2022.01); *H04W 12/06* (2013.01)

(58) Field of Classification Search
CPC ..... H04W 4/029; H04W 12/06; H04W 80/04; H04W 4/02; H04W 4/021; H04W 4/90; H04W 4/023; H04W 4/06; H04W 4/14; H04W 4/12; H04W 76/50; H04W 8/12; H04W 60/00; H04W 88/02; H04W 12/02; H04W 12/03; H04W 4/025; H04W 4/33; G06F 21/32; G06V 40/166; G06Q 20/327; G06Q 20/341; G06Q 20/425; G06Q 20/3226; G06Q 20/3265; G06Q 20/3255; G06Q 50/265; G06Q 20/40; G06Q 30/0639; G06Q 20/40145; G06Q 20/405; G06Q 20/42; G06Q 30/0269; G06Q 50/01;
(Continued)

(56) References Cited

U.S. PATENT DOCUMENTS 7,327,442 B1* 2/2008 Fear ........................ G01C 3/32
356/4.08
7,995,117 B1 8/2011 Bonn
(Continued)

*Primary Examiner* — Nimesh Patel
(74) *Attorney, Agent, or Firm* — Fletcher Yoder, P.C.

(57) ABSTRACT

A computing device establishes communication with a financial institution communication device, and receives an instruction for a user to perform an action to authenticate the user. The action includes providing user-provided data indicative of a location. The computing device determines first location information based on the user-provided data. The computing device also determines second location information using a location sensor. The computing device authenticates the used based on determining that the first location information correlates to the second location information.

14 Claims, 7 Drawing Sheets

Related U.S. Application Data

(60) Provisional application No. 62/892,270, filed on Aug. 27, 2019.

(51) Int. Cl.
   *G06V 40/16* (2022.01)
   *H04W 12/06* (2021.01)

(58) Field of Classification Search
   CPC ........ G16H 40/67; G16H 40/20; G16H 10/60; G16H 40/60; G16H 10/20; G16H 20/10; G16H 70/00; Y02D 30/70; H04M 2207/18; H04M 2242/30; H04M 1/72436; H04M 1/72454; H04M 1/72463; H04M 3/2281
   See application file for complete search history.

(56) References Cited

U.S. PATENT DOCUMENTS

| | | | |
|---|---|---|---|
| 10,257,229 B1* | 4/2019 | Kuo | H04L 63/20 |
| 2012/0327265 A1 | 12/2012 | Arujunan | |
| 2014/0157381 A1* | 6/2014 | Disraeli | H04L 63/0853 |
| | | | 726/7 |
| 2015/0221151 A1* | 8/2015 | Bacco | H04L 9/3231 |
| | | | 340/5.83 |
| 2016/0021507 A1 | 1/2016 | Gaines | |
| 2016/0300242 A1 | 10/2016 | Truong | |
| 2017/0055146 A1* | 2/2017 | Ko | H04W 12/068 |
| 2017/0093846 A1* | 3/2017 | Lopez Lecube | H04W 12/068 |
| 2017/0169202 A1 | 6/2017 | Duggan | |
| 2019/0162815 A1* | 5/2019 | Taniguchi | G01S 5/02585 |
| 2020/0065602 A1* | 2/2020 | Ionita | H04N 23/611 |

* cited by examiner

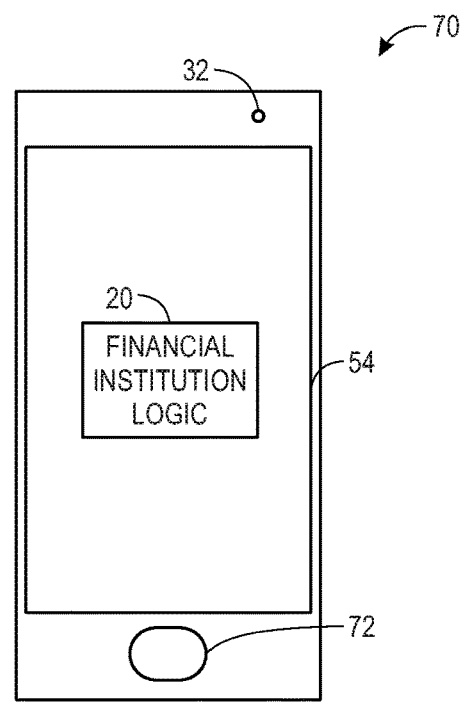
*FIG. 2*
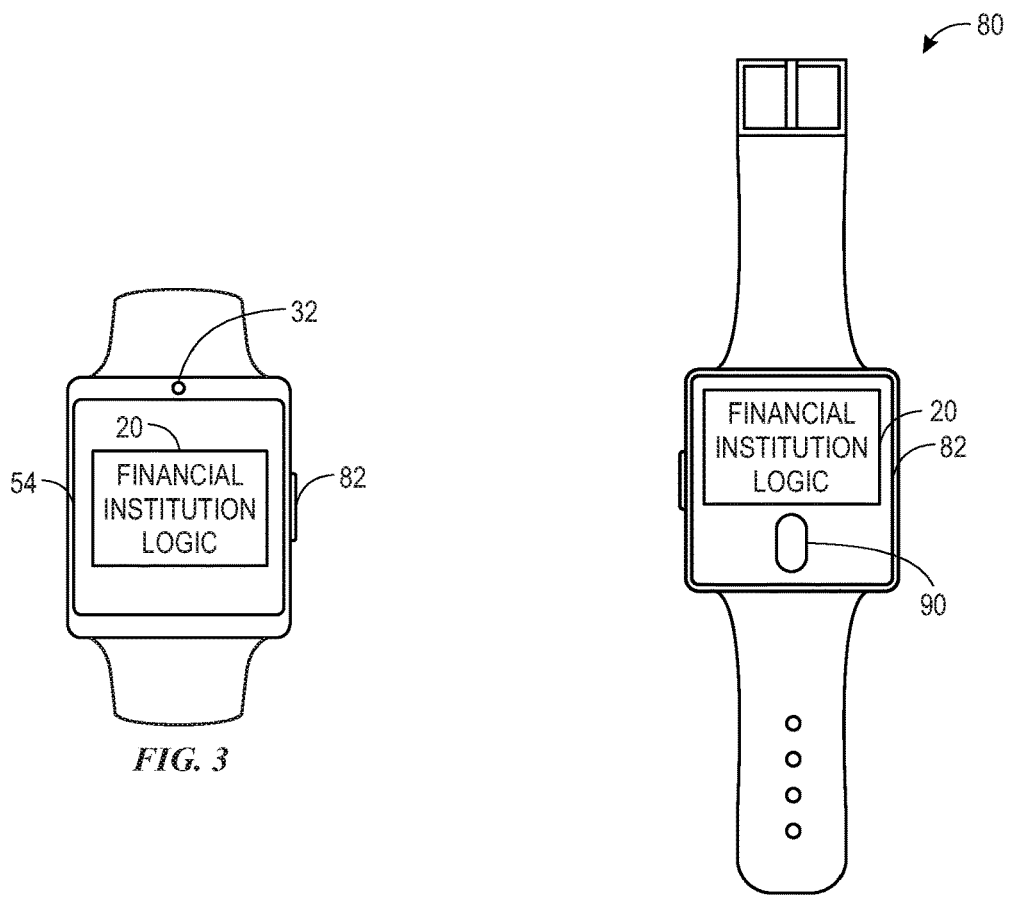
*FIG. 3*
*FIG. 4*

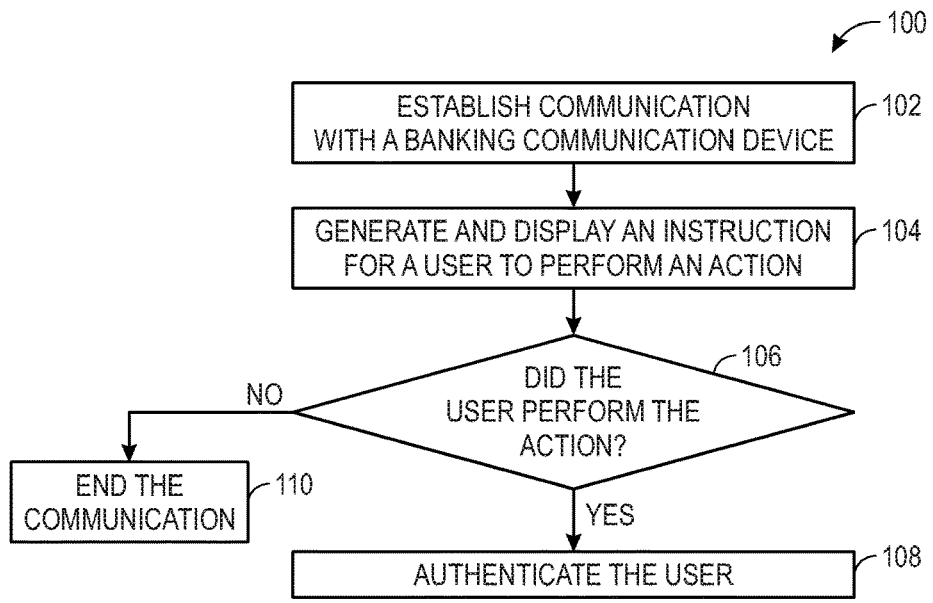
*FIG. 5*
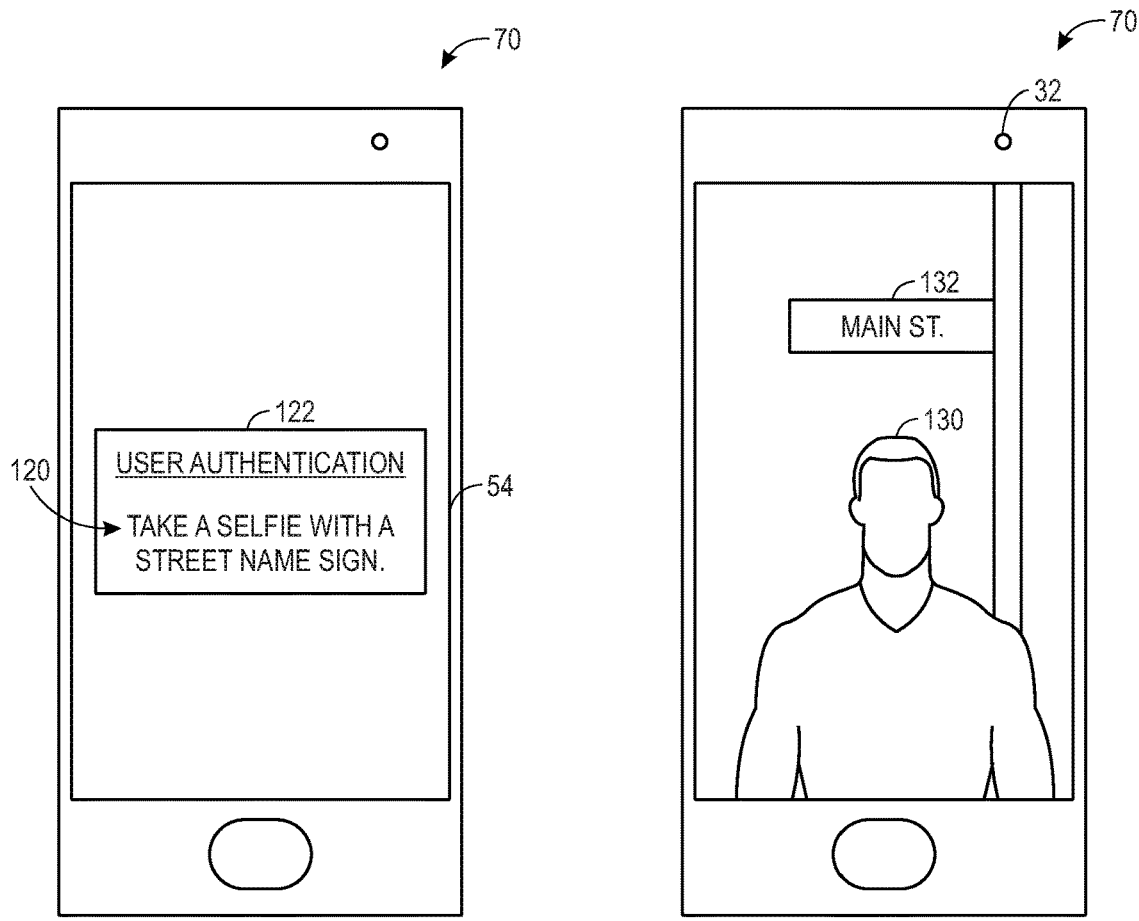
*FIG. 6*     *FIG. 7*

SYSTEMS AND METHODS FOR FRAUD PREVENTION

CROSS REFERENCE TO RELATED APPLICATIONS

This application is a divisional of U.S. patent application Ser. No. 17/003,721, filed Aug. 26, 2020, and further, claims priority to and the benefit of U.S. Provisional Application Ser. No. 62/892,270, entitled "SYSTEMS AND METHODS FOR FRAUD PREVENTION," filed Aug. 27, 2019, which is hereby incorporated by reference in its entirety for all purposes.

BACKGROUND

The present disclosure relates generally to fraud prevention, and more particularly to systems and methods for preventing fraudulent financial transactions from being performed.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Financial transaction fraud may occur when a defrauder uses a victim's identity and performs a financial transaction using the victim's funds or credit. Not only does this result in an at least temporary reduction of the victim's fund or credit, but the financial institution may hold or freeze the victim's accounts, close the victim's accounts, open new accounts, issue new account information, checks, and/or cards, and so on. Moreover, the victim may not have access to the funds or credit in his or her accounts while the financial institution addresses the fraud.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a computing device includes an electronic display, a location sensor, one or more processors, and one or more memory devices that store instructions that, when executed by the one or more processors, cause the one or more processors to display, via the electronic display, an indication of an action for a user to perform. The instructions also cause the one or more processors to receive user-provided data in response to receiving the indication of the action for the user to perform, determine first location information based on the user-provided data, and determine second location information based on location data received from the location sensor. The instructions further cause the one or more processors to authenticate the user based on determining that the first location information correlates to the second location information.

In an embodiment, one or more non-transitory, tangible, computer-readable media includes instructions that, when executed by one or more processors, cause the one or more processors to output, via an electronic device, an indication of an action for a user to perform. The instructions also cause the one or more processors to receive distance or movement data from one or more sensors of the electronic device after the indication of the action is outputted. Additionally, the instructions cause the one or more processors to authenticate the user at least in response to determining that the distance or movement data correlates to physical data for the user.

In an embodiment, a method includes outputting an indication of an action for a user to perform via an electronic device, and instructing a camera of the electronic device to capture one or more images after outputting the indication of the action for the user to perform. The method also includes determining first location information based on the one or more images from the camera, and determining second location information of the electronic device based on location data received from a sensor of the electronic device. The method further includes authenticating the user at least in response to determining that the first location information correlates to the second location information.

BRIEF DESCRIPTION OF THE DRAWINGS

Various aspects of this disclosure may be better understood upon reading the following detailed description and upon reference to the drawings in which:

FIG. 2 is a diagram of a front view of a computing device of the fraud prevention system of FIG. 1 in the form of a smartphone or tablet, according to embodiments of the present disclosure;

FIG. 3 is a diagram of a front view of the computing device of the fraud prevention system of FIG. 1 in the form of a wearable device, according to embodiments of the present disclosure;

FIG. 4 is a diagram of a rear view of the computing device in the form of the wearable device of FIG. 3, according to embodiments of the present disclosure;

FIG. 5 is a flowchart illustrating a method for authenticating a user based on the user performing an action, according to embodiments of the present disclosure;

FIG. 6 is a diagram of the computing device of FIG. 2 in the form of a smartphone or tablet displaying a message that requests that a user perform an action, according to embodiments of the present disclosure;

FIG. 7 is a diagram of the computing device in the form of a smartphone or tablet used to perform the action of FIG. 6, according to embodiments of the present disclosure;

DETAILED DESCRIPTION

Figure 1:
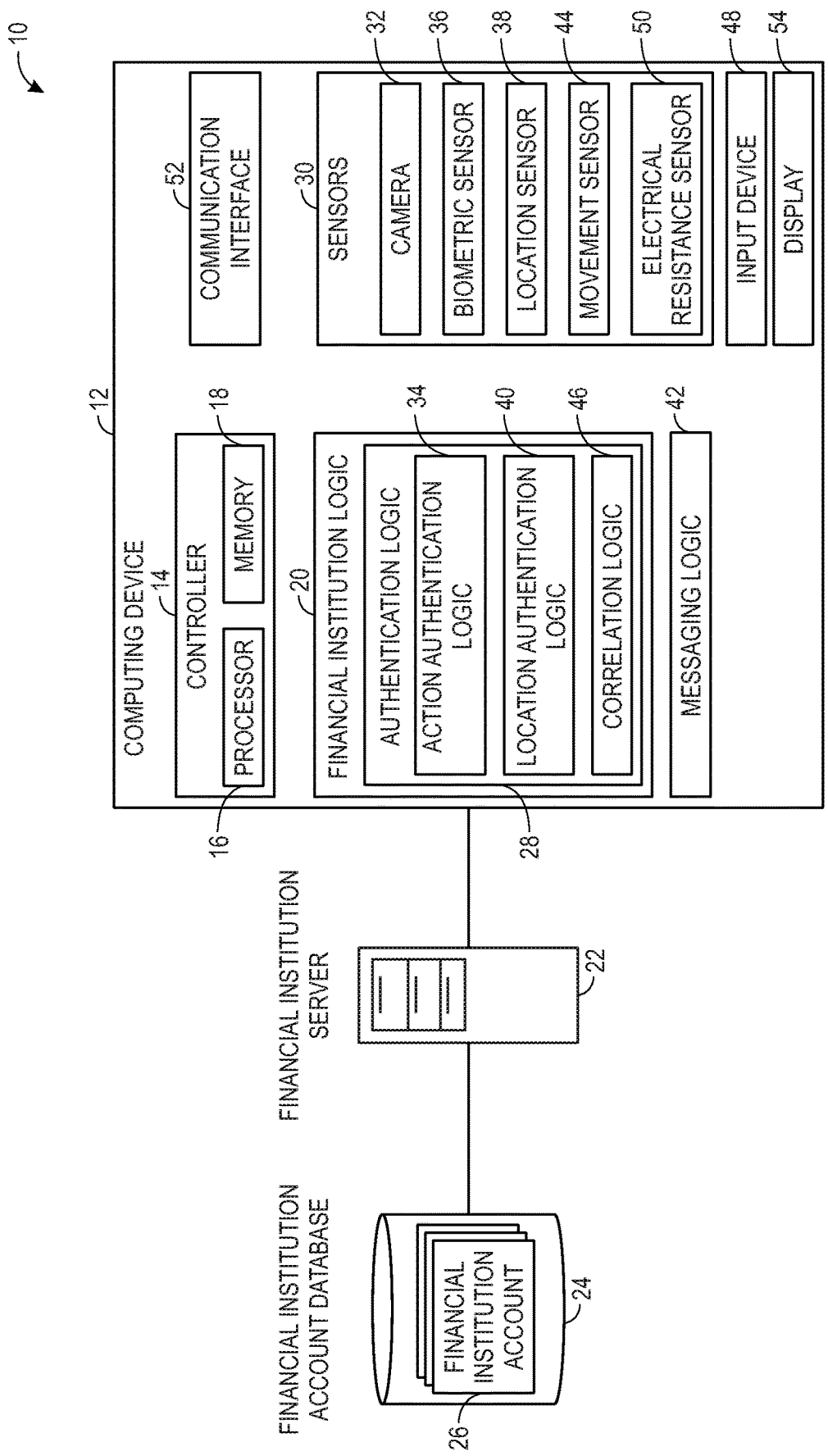
FIG. 1 is a block diagram of a fraud prevention system, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The presently disclosed systems and methods include a computing device that establishes communication (e.g., via a telephone call) with a financial institution communication device, and receives an instruction for a user to perform an action to authenticate the user, while still in communication with the financial institution communication device. The instruction may be in the form of a text (e.g., a short message service (SMS)) message, a video, or the like. The action may include providing a specific response (e.g., using an input device of the computing device), such as sending back a text message or a drawing. If the computing device determines that the user performed the action, then the computing device may authenticate the user.

In some embodiments, the computing device may provide its location to the financial institution communication device in conjunction with other confirmatory information of the location. For example, the action may include using a camera of the communication device to capture a photo indicative of where the communication device is located (e.g., including a street sign, store sign, or other location-identifying feature). The computing device may then determine whether the location provided by the computing device correlates or matches to the location-identifying feature of the photo. If such a correlation is confirmed, then the computing device may authenticate the user.

In another embodiment, the presently disclosed systems and methods include the computing device instructing the user to perform a movement-based action, and may correlate physical characteristics or behaviors of the user to the movement-based action. The computing device may store the user's physical characteristics or behaviors as physical authentication data, and if the correlated physical characteristics or behaviors of the user derived from the movement-based action match, then the computing device may authenticate the user.

The presently disclosed systems and methods also include performing authentication of the user to release funds or accounts that may be held or frozen. For example, funds that have been recently deposited in the user's financial institution account may be held until a threshold period of time has elapsed. Similarly, when the user opens a new credit card account, the new credit card account may be frozen until a threshold period of time has elapsed. When the user attempts to use funds from the held or frozen account, the computing device may perform authentication of the user. If the user is authenticated, then the computing device may release the funds or perform the respective financial transaction.

The presently disclosed systems and methods further include enabling the user to confirm or authenticate an identity of a recipient of funds. For example, the user may desire to send funds to a recipient, but the user may be unsure whether the information used to identify the recipient (e.g., name, address, phone number, email address, and so on) is correct. Prior to sending the funds, the computing device may send a message to the recipient via established contact information for the recipient to confirm that the recipient received a request to receive the funds. If the recipient confirms receipt of the request, the computing device may send the funds. If the recipient does not confirm receipt of the request, the computing device may cancel the transaction.

The presently disclosed systems and methods may include using any suitable sensor to authenticate the user, including an electrical resistance sensor. The electrical resistance sensor may detect an electrical resistance of the user, which may be generally unique to each individual. To receive an accurate measurement of the electrical resistance of the user, the computing device may also determine additional information, such as conditions that impact the electrical resistance. For example, certain environmental characteristics correlated to where the computing device is located (e.g., temperature, humidity) may impact measurement of electrical resistance and may be identified to modify measurements of electrical resistance. Other data, such as that related to a condition or state of the user, time of day, and/or location at which the measurements are taken, may also be used to modify measurements of electrical resistance. This additional information may be obtained using other sensors and/or information received over a communication network (e.g., the Internet).

With the foregoing in mind, FIG. 1 is a block diagram of a fraud prevention system 10, according to embodiments of the present disclosure. As illustrated, the fraud prevention system 10 includes a computing device 12, which may be in the form of any suitable electronic computing device, such as a computer, laptop, personal computer, server, mobile device, smartphone, tablet, wearable device, and so on. The computing device 12 may include a controller 14 that includes one or more processors 16 and one or more memory and/or storage devices 18. The one or more processors 16 (e.g., microprocessors) may execute software programs and/or instructions to facilitate determining when a fraudulent financial transaction is attempted and/or preventing the fraudulent financial transaction. Moreover, the one or more processors 16 may include multiple microprocessors, one or more "general-purpose" microprocessors, one or more special-purpose microprocessors, and/or one or more application specific integrated circuits (ASICS), or some combination thereof. For example, the one or more processors 16 may include one or more reduced instruction set (RISC) processors.

The one or more memory devices 18 may store information such as control software, look up tables, configuration data, etc. In some embodiments, the one or more processors 16 and/or the one or more memory devices 18 may be external to the controller 14 and/or the computing device 12. The one or more memory devices 18 may include a tangible, non-transitory, machine-readable-medium, such as a volatile memory (e.g., a random access memory (RAM)) and/or a nonvolatile memory (e.g., a read-only memory (ROM)). The one or more memory devices 18 may store a variety of information and may be used for various purposes. For example, the one or more memory devices 18 may store machine-readable and/or processor-executable instructions (e.g., firmware or software) for the one or more processors 16 to execute, such as instructions for determining when a fraudulent financial transaction is attempted and/or preventing the fraudulent financial transaction. The one or more memory devices 18 may include one or more storage devices (e.g., nonvolatile storage devices) that may include read-only memory (ROM), flash memory, a hard drive, or any other suitable optical, magnetic, or solid-state storage medium, or a combination thereof.

The computing device 12 may also include financial institution logic 20 that enables a user to communicate with, perform transactions with, and/or otherwise interact with a financial institution server 22 of a financial institution. The financial institution may be any suitable entity that stores funds or provides credit to the user, such as a bank, credit card company, credit union, savings and loan association, investment company, brokerage firm, insurance company, or mortgage company. The financial institution server 22 may be any suitable computing device that facilitates performing financial transactions with the financial institution. The computing device 12 may be communicatively coupled to the financial institution server 22 via a communication network, such as a mobile communication network, a WiFi network, local area network (LAN), wide area network (WAN), and/or the Internet. The financial institution server 22 may also be communicatively coupled to a financial institution account database 24, which stores information related to financial institution accounts 26, including a financial institution account 26 of the user. For example, the financial institution account database 24 may store identification information and balance information associated with respective financial institution accounts 26.

The financial institution logic 20 may enable a user to deposit funds in a respective financial institution account 26, withdraw funds from the respective financial institution account 26, apply funds in the respective financial institution account 26 to purchases, apply credit supplied by the respective financial institution account 26 to purchases, or make payments to reduce a credit or loan balance of the respective financial institution account 26. As used herein, the term "logic" may include software (e.g., instructions executable by a processor, such as the processor 16), hardware (e.g., circuitry), or a combination of the two. As such, the financial institution logic 20 may at least partially be implemented in the form of a software application (e.g., an "app") stored and/or executing on the computing device 12.

The financial institution logic 20 may include authentication logic 28 that facilitates authenticating the user. The authentication logic 28 may confirm the user's identity, and thus be particularly suited for preventing fraud in cases where a defrauder uses a victim's identity and contacts both the victim and the financial institution using what is referred to as a "man-in-the-middle" tactic. This tactic involves the fraudster assuming the identity of the victim when contacting the financial institution, assuming the identity of the financial institution when contacting the victim, relaying or repeating the authentication process performed by the financial institution to the victim, and using the victim's responses to authenticate themselves with the financial institution.

The authentication logic 28 may also perform authentication of the user to bypass situations in which the user's funds are being held or financial institution accounts 26 are frozen. For example, funds that have been recently deposited in the user's bank account may be held until a threshold period of time has elapsed. Similarly, when the user opens a new credit card account, the new credit card account may be frozen until a threshold period of time has elapsed. When the user attempts to use funds from the held or frozen account, the authentication logic 28 may perform authentication of the user. If the authentication logic 28 authenticates the user, then the controller 14 may instruct the financial institution server 22 to release the funds or perform the respective financial transaction.

As illustrated, the computing device 12 may include a number of sensors 30, such as one or more cameras 32, one or more biometric sensors 36, one or more location sensors 38, one or more movement sensors 44, one or more electrical resistance sensors 50, or any other suitable sensors that may facilitate authenticating the user.

The camera 32 may include any suitable image or video capture device, and may be used to capture an image or video of the user that may include characteristics generally unique to the user, such as facial characteristics of the user. For example, the computing device 12 and/or the financial institution server 22 may store an authenticated image or video of the user, and the authentication logic 28 may compare the image or video captured by the camera 32 to the authenticated image or video of the user (e.g., using facial recognition techniques) to authenticate the user.

The authentication logic 28 also includes action authentication logic 34 that facilitates authenticating the user through actions performed by the user. For example, the action authentication logic 34 may turn on the camera 32, instruct the user to perform an action (e.g., look in a certain direction, blink, wink, open or close the user's mouth, stick the user's tongue out, pull the user's ear, or pinch the user's nose), and capture a video or series of images of the user attempting to perform the action using the camera 32. The action authentication logic 34 may then determine whether the user performed the action (e.g., using image recognition techniques) to authenticate the user.

The biometric sensor 36 may include any suitable sensor that detects biometric information of the user that may be generally unique to the user, such as information associated with the user's fingerprints, palm veins, DNA, palm print, hand geometry, iris recognition, retina, odor, or scent. As such, the biometric sensor 36 may include a fingerprint reader, a palm reader, a DNA scanner, an iris scanner, a retina scanner, or an odor sensor. The computing device 12 and/or the financial institution server 22 may store authenticated biometric information of the user, and the authentication logic 28 may compare the biometric information detected by the biometric sensor 36 to the authenticated biometric information of the user to authenticate the user.

The location sensor 38 may include any suitable sensor that facilitates determining a location of the computing device 12 using any suitable location technology, such as a global positioning system (GPS). The computing device 12 and/or the financial institution server 22 may store location information associated with the user, such as where the user is from, resides, works, or frequents. The authentication logic 28 may compare the location determined by the location sensor 38 to the stored location information associated with the user to authenticate the user.

The authentication logic 28 also includes location authentication logic 40 that facilitates authenticating the user through location. For example, the location authentication logic 40 may use the location sensor 38 to determine where the computing device 12 (and thus the user) is located (e.g., first location information), and request that the user provide location information (e.g., second location information)

associated with their location. In some embodiments, the location authentication logic 40 may request that the user send a message (e.g., a text message) using messaging logic 42 of the computing device 12 to a communication device of the financial institution of a nearby address, street intersection, landmark, retail store, or description of surroundings. In alternative or additional embodiments, the location authentication logic 40 may request that the user take a photo or video using the camera 32 that includes location information of where the user is located, such as an address marker, a street sign, a landmark, or a store sign. The location authentication logic 40 may also request that the user include themselves in the photo or video (e.g., by taking a "selfie"). The location authentication logic 40 may then determine whether the location information in the user's message, photo, or video matches or correlates with the location determined by the location sensor 38. For example, first location information may correlate or correspond to second location information if there is a threshold amount of overlap therebetween (e.g., coordinates for the first location are within a threshold of coordinates for the second location information).

The messaging logic 42 may include any logic that enables the computing device 12 to send or receive messages over, for example, a communication network, such as a mobile communication network, a WiFi network, local area network (LAN), wide area network (WAN), and/or the Internet. For example, the messaging logic 42 may enable the computing device 12 to send short messaging service (SMS) messages, multimedia messaging service (MMS) messages, push notifications, in-app (e.g., within a software application or "app") messages, and so on.

The movement sensor 44 may include any suitable sensor that detects and/or measures movement of the computing device 12, such as an accelerometer, gyroscope, or magnetometer. The action authentication logic 34 may instruct the user to perform a movement with the computing device 12 (e.g., draw a pattern, shape, symbol, letter, or number), and use the movement sensor 44 to detect the subsequent movement of the computing device 12. In some embodiments, the action authentication logic 34 may also or alternatively determine the subsequent movement of the computing device 12 using the location sensor 38. The action authentication logic 34 may then compare the detected movement to the instructed movement to determine whether the user performed the movement to authenticate the user.

The authentication logic 28 also includes correlation logic 46 that correlates movements of the computing device 12 as detected by the movement sensor 44 and/or the locations of the computing device 12 as determined by the location sensor 38 to physical characteristics or behaviors of the user. That is, the action authentication logic 34 may instruct the user to perform certain actions with the computing device 12 that enable the correlation logic 46 to correlate physical characteristics or behaviors of the user from the resulting movements or locations of the computing device 12 as detected by the movement sensor 44 or the location sensor 38. For example, the action authentication logic 34 may instruct the user to touch the computing device 12 to their head and their toes. The movement sensor 44 may determine a distance traveled by the computing device 12, and the correlation logic 46 may then correlate the distance to the height of the user. As another example, the action authentication logic 34 may instruct the user to hold the computing device 12 straight out in front of them and then touch the computing device 12 to their shoulder. The movement sensor 44 may determine a distance traveled by the computing device 12, and the correlation logic 46 may then correlate the distance to the length of an arm of the user. The computing device 12 and/or the financial institution server 22 may store certain physical characteristics of the user for authentication purposes (including the height or length of the arm of the user), and the action authentication logic 34 may compare a correlated physical characteristic of the user to the stored physical characteristic of the user to authenticate the user. Image captures (e.g., pictures) may be taken at certain points or throughout a movement to confirm positioning. For example, a picture of a top of a user's head and a picture of a user's feet may be required to confirm camera positioning.

In some embodiments, the action authentication logic 34 may authenticate the user based on a physical behavior of the user. The physical behavior may include the user's walking gait, the user's typing rhythm, the user's voice, or any other suitable measurable behavior of the user. In some embodiments, the action authentication logic 34 may instruct the user to perform an action, such as walking, typing, or talking, and use the movement sensor 44, the location sensor 38, any other suitable sensor (e.g., a microphone), and/or an input device 48 of the computing device 12 to determine the relevant physical behavior information. The correlation logic 46 may then determine the user's gait, typing rhythm, or voice identifying characteristics based on the determined physical behavior information. In alternative or additional embodiments, the action authentication logic 34 may not send an instruction, and may instead use the movement sensor 44, the location sensor 38, any other suitable sensor (e.g., a microphone), and/or an input device 48 of the computing device 12 to determine the relevant physical behavior information while the user is using the computing device 12 and/or while the computing device 12 is not being actively used by the user. Moreover, the action authentication logic 34 may continue to collect and store the physical behavior information of the user while the user is using the computing device 12 and/or while the computing device 12 is not being actively used by the user to improve accuracy of the physical behavior analysis and comparison performed by the action authentication logic 34.

The input device 48 may be any suitable device of the computing device 12 that may enable the user to enter information to the computing device 12, such as a keyboard, a mousing device, or a touchscreen. In some embodiments, the input device 48 may include a sensor 30, such as the camera 32 or a microphone. The action authentication logic 34 may authenticate the user based on information entered using the input device 48, such as a login, a password, a personal identification number (PIN), a spoken password, or a movement-based password. Moreover, in some embodiments, the correlation logic 46 may correlate the user's use of the input device 48 to a physical behavior of the user. For example, the correlation logic 46 may determine a typing rhythm of the user based on the user typing on the input device 48, and the action authentication logic 34 may authenticate the user based on stored typing rhythm information of the user.

The electrical resistance sensor 50 may detect an electrical resistance of the user, which may be generally unique to each individual. Because the electrical resistance of an individual may vary with certain environmental characteristics, such as temperature, humidity, condition or state of the user, time of day, and/or location, the computing device 12 may also determine at least some of these environmental characteristics to receive an accurate measurement of the electrical resistance of the user. As such, the authentication logic 28 may use certain sensors 30 (e.g., the location sensor 38, a temperature sensor, a humidity sensor, the biometric sensor 36, or the movement sensor 44), and/or information received over a communication network (e.g., location information, temperature information, humidity information, information posted on to a social media account of the user, time of day information, or date information) to determine environmental characteristics that may affect the electrical resistance of the user. The authentication logic 28 may then adjust the electrical resistance measurement of the user received from the electrical resistance sensor 50 based on the determined environmental characteristics. The computing device 12 and/or the financial institution server 22 may store the electrical resistance of the user for authentication purposes, and the authentication logic 28 may compare the adjusted electrical resistance measurement to the stored electrical resistance of the user to authenticate the user.

Using the described devices, components, and techniques, the authentication logic 28, including the action authentication logic 34, the location authentication logic 40, and the correlation logic 46, may be effective in confirming the user's identity, thus being particularly suited for preventing man-in-the-middle attacks.

As illustrated, the computing device 12 may include a communication interface 52 that enables the computing device 12 to communicatively couple to any suitable communication network. The computing device 12 may also include an electronic display 54 that enables graphical and/or visual output to be displayed to a user. The display 54 may use any suitable display technology, and may include an electroluminescent (ELD) display, liquid crystal (LCD) display, light-emitting diode (LED) display, organic LED (OLED) display, active-matrix OLED display, plasma display panel (PDP), quantum dot LED (QLED) display, and so on. For example, the display 54 may output any of the instructions disclosed above for the user to perform for authentication purposes and/or output messages sent from the financial institution server 22 as received by the communication interface 52 over a communication network.

As mentioned above, the computing device 12 may any be suitable electronic computing device, such as a computer, laptop, personal computer, server, mobile device, smartphone, tablet, wearable device, and so on. For example, FIG. 2 is a diagram of the computing device 12 in the form of a smartphone 70 or tablet, according to embodiments of the present disclosure. As illustrated, the smartphone 70 may include a display 54 that may be a touchscreen, and, as such, may also act as an input device 48. The smartphone 70 may include a camera 32. The smartphone 70 may also include a button 72 that is an input device 48, but may also serve as a biometric sensor 36 (e.g., a fingerprint reader) and/or an electrical resistance sensor 50. As illustrated, the smartphone 70 includes the financial institution logic 20, in accordance with present embodiments.

As another example, FIG. 3 is a diagram of a front view of the computing device 12 in the form of a wearable device 80 (e.g., a smartwatch), according to embodiments of the present disclosure. As illustrated, the wearable device 80 may include a display 54 that may be a touchscreen, and, as such, may also act as an input device 48. The wearable device 80 may also include a camera 32, and a button 82 that is an input device 48. FIG. 4 is a diagram of a rear view of the computing device 12 in the form of the wearable device 80, according to embodiments of the present disclosure. As illustrated, the wearable device 80 may include a sensor 90, that may act as a biometric sensor 36 (e.g., a DNA scanner or an odor sensor) and/or an electrical resistance sensor 50. Also, as illustrated in FIG. 3, the wearable device 80 includes the financial institution logic 20, in accordance with present embodiments.

With the foregoing in mind, FIG. 5 is a flowchart illustrating a method 100 for authenticating the user based on the user performing an action, according to embodiments of the present disclosure. The method 100 may be performed by any suitable device that may control components of the fraud prevention system 10 of FIG. 1, such as the controller 14, the financial institution server 22, the financial institution logic 20, the authentication logic 28, the action authentication logic 34, and/or the location authentication logic 40. While the method 100 is described using steps in a specific sequence, it should be understood that the present disclosure contemplates that the described steps may be performed in different sequences than the sequence illustrated, and certain described steps may be skipped or not performed altogether. In some embodiments, the method 100 may be implemented by executing instructions stored in a tangible, non-transitory, computer-readable medium, such as the one or more memory devices 18, using a processor, such as the one or more processors 16.

As illustrated, in process block 102, the processor 16 establishes communication with a banking communication device. For example, the processor 16 may establish communication with the banking communication device over a telephone network by making a telephone call using the communication interface 52.

In process block 104, the processor 16 generates or receives an instruction for the user to perform an action to authenticate the user. In particular, the action authentication logic 34 (or the financial institution server 22) may generate an action for the user to perform to authenticate themselves, and send the instruction to the processor 16 to be communicated to the user via the display 54 of the computing device 12. For example, FIG. 6 is a diagram of the computing device 12 of FIG. 2 in the form of a smartphone 70 or tablet displaying a message 120 that requests that the user perform an action 122, according to embodiments of the present disclosure. As illustrated, the message 120 requests that the user perform the action 122 of taking a selfie with a street name sign.

In decision block 106, the action authentication logic 34 determines whether the user performed the action instructed in process block 104. For example, FIG. 7 is a diagram of the computing device 12 in the form of a smartphone 70 or tablet used to perform the action 122 of FIG. 6, according to embodiments of the present disclosure. As illustrated, the user 130 has directed the camera 32 of the smartphone 70 at themselves to capture an image of themselves, as well as a street sign 132.

If the action authentication logic 34 determines that the user performed the action, then, in process block 108, the authentication logic 28 authenticates the user. In some cases, the authentication logic 28 may determine whether the action performed by the user matches authenticated information associated with the user. That is, in the example illustrated in FIG. 7, the location authentication logic 40 may determine location information in the captured image associated with the street sign 132 (e.g., that the user 130 is located on Main Street), and compare that image-based location information to location information received from the location sensor 38 (e.g., sensor-based location information). If the image-based location information matches the sensor-based location information, then it is more likely that the user is who they say they are (instead of a defrauder calling from a different location), and the authentication logic 28 may authenticate the user. Present embodiments may perform a granulated analysis of image data to confirm authenticity, such as by confirming relative measures based on the image data (e.g., confirming the height of the sign 132 relative to the height of the user 130 is appropriate based on established data and taking into account image depth and other image characteristics).

If the action authentication logic 34 determines that the user did not perform the action, then, in process block 110, the processor 16 ends the communication. The action authentication logic 34 may determine that the user did not perform the action if it does not receive an indication that an attempt to perform the action within a threshold time period (such that the attempt timed out), it receives an indication that an attempt to perform the action but the attempt was incorrect (e.g., another action was performed that was not the requested action), or it receives an indication of an attempt to perform the action but the attempt included information that indicates a defrauder. An example of the attempt indicating a defrauder may include receiving different user characteristics than expected when the defrauder performs a requested action (e.g., the defrauder touches their head and toes, and a resulting derived height does not correlate or match with a stored height of the approved user). The example of FIG. 7 is also illustrative, wherein the street sign 132 indicates a location that is different than that provided by the location sensor 38 of the computing device 12, thus indicating that a fraud may be occurring.

It should be understood that the action 122 of taking a selfie with a street sign 132 is used as an example, and the method 100 may include instructing the user 130 to perform any suitable action, such as where the action 122 may be part of a password or credential (e.g., looking in a certain direction, blinking, winking, opening or closing the user's mouth, sticking the user's tongue out, pulling the user's ear, pinching the user's nose, making symbols with the user's hands, or performing a sequence of any of these actions). In this manner, the method 100 may authenticate the user based on the user performing an action, and prevent fraudulent financial transactions from being performed.

Figure 8:
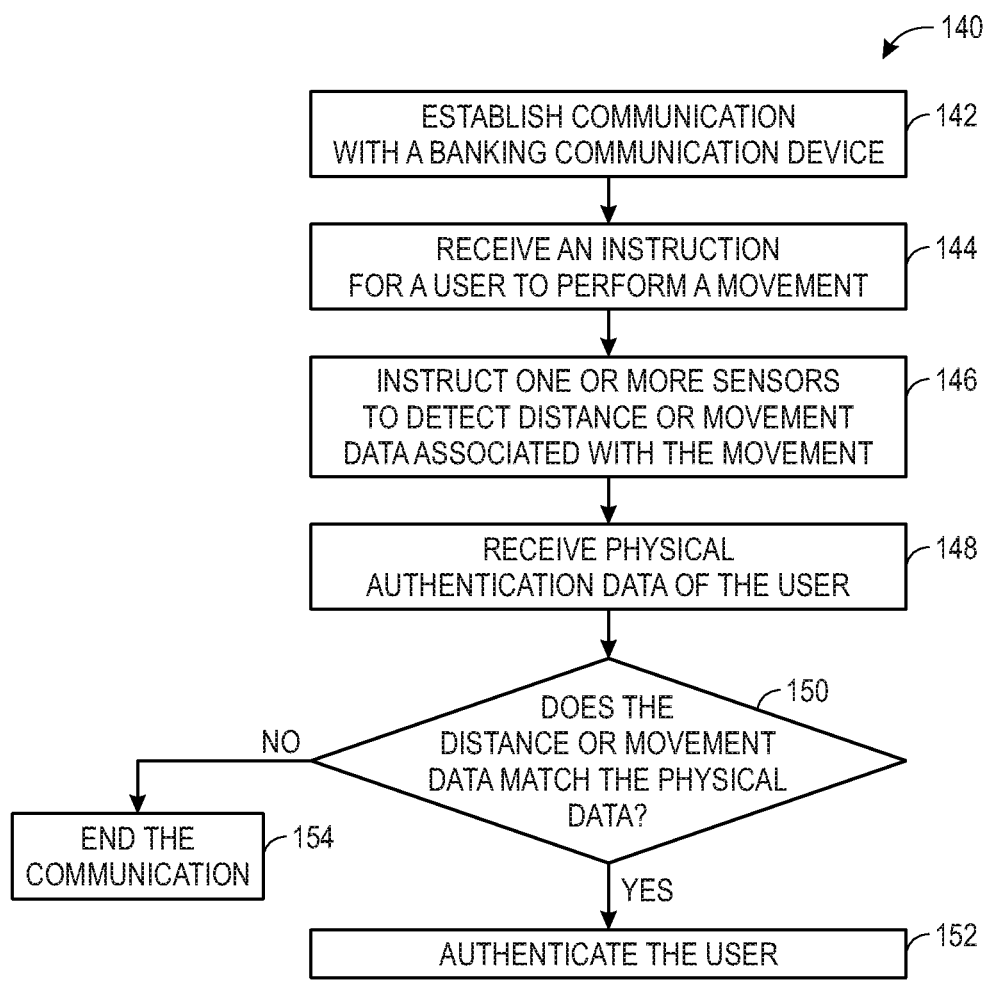
FIG. 8 is a flowchart illustrating a method for authenticating a user based on user movement, according to embodiments of the present disclosure.

FIG. 8 is a flowchart illustrating a method 140 for authenticating the user based on user movement, according to embodiments of the present disclosure. The method 140 may be performed by any suitable device that may control components of the fraud prevention system 10 of FIG. 1, such as the controller 14, the financial institution server 22, the financial institution logic 20, the authentication logic 28, the action authentication logic 34, and/or the correlation logic 46. While the method 140 is described using steps in a specific sequence, it should be understood that the present disclosure contemplates that the described steps may be performed in different sequences than the sequence illustrated, and certain described steps may be skipped or not performed altogether. In some embodiments, the method 140 may be implemented by executing instructions stored in a tangible, non-transitory, computer-readable medium, such as the one or more memory devices 18, using a processor, such as the one or more processors 16.

Figure 9:
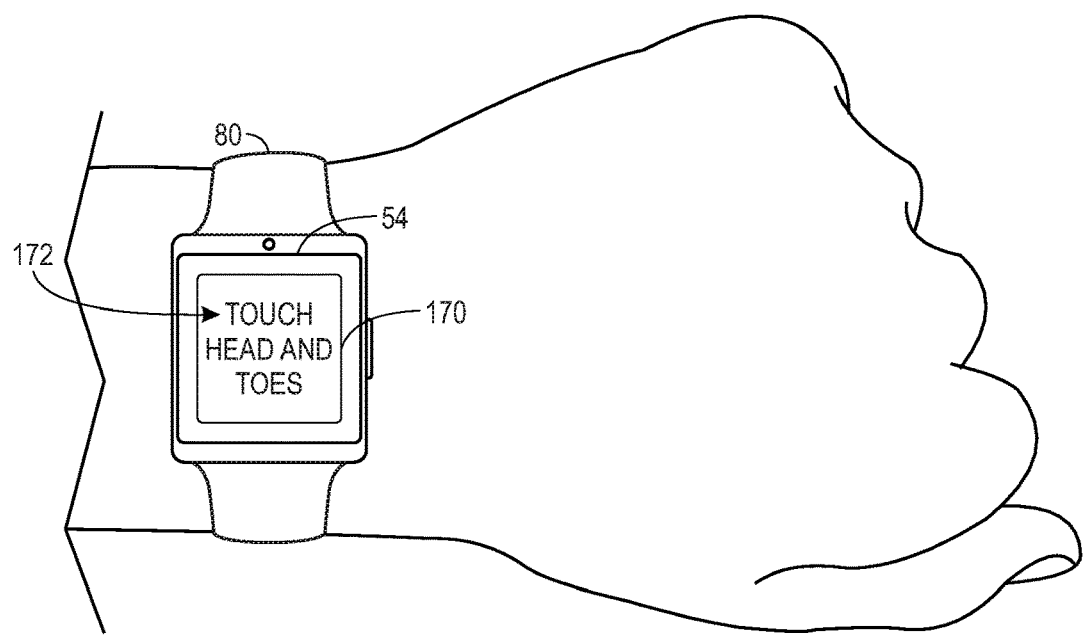
FIG. 9 is a diagram of the computing device of FIG. 3 in the form of a wearable device displaying a message that requests that a user perform a movement, according to embodiments of the present disclosure.

As illustrated, in process block 142, the processor 16 establishes communication with a banking communication device. In process block 144, the processor 16 generates or receives an instruction for the user to perform a movement to authenticate the user. In particular, the action authentication logic 34 (or the financial institution server 22) may generate a movement for the user to perform to authenticate themselves, and send the instruction to the processor 16 to be communicated to the user via the display 54 of the computing device 12. The movement may be associated with a physical characteristic of the user, such as the height of the user, a length of a limb of the user, a circumference of a skull of the user, and so on. For example, FIG. 9 is a diagram of the computing device 12 of FIG. 3 in the form of a wearable device 80 displaying a message 170 that requests that the user perform a movement 172, according to embodiments of the present disclosure. As illustrated, the message 170 requests that the user perform the movement 172 of touching their head and toes.

Figure 10:
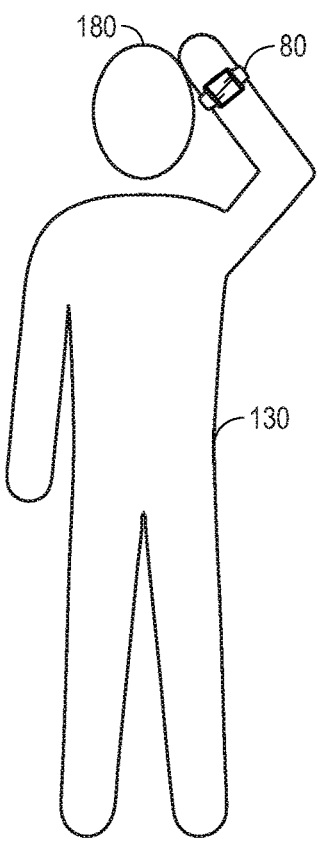
FIG. 10 is a diagram of a user with the wearable device touching their head to perform the movement of FIG. 9, according to embodiments of the present disclosure.
Figure 11:
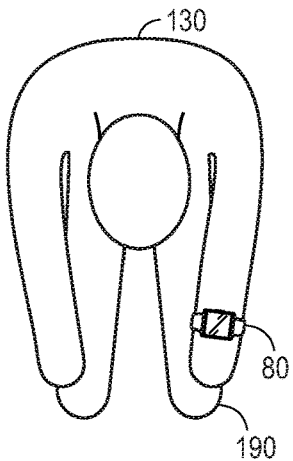
FIG. 11 is a diagram of a user with the wearable device touching their toes to perform the movement of FIG. 9, according to embodiments of the present disclosure.

In process block 146, the action authentication logic 34 instructs the movement sensor 44 to detect distance or movement data associated with the movement 172. For example, FIG. 10 is a diagram of the user 130 with the wearable device 80 touching their head 180 to perform the movement 172 of FIG. 9, according to embodiments of the present disclosure. FIG. 11 is a diagram of the user 130 with the wearable device 80 touching their toes 190 to perform the movement 172 of FIG. 9, according to embodiments of the present disclosure.

In process block 148, the action authentication logic 34 receives physical authentication data of the user associated with the movement 172. In the example illustrated in FIGS. 9-11, the action authentication logic 34 may receive a height of the user.

In decision block 150, the action authentication logic 34 determines whether the distance or movement data matches the physical authentication data. In particular, the correlation logic 46 may determine a physical characteristic of the user based on the distance or movement data. In the example illustrated in FIGS. 9-11, the correlation logic 46 may determine the height of the user based on the distance or movement data received from the user 130 touching their head 180 and toes 190. The action authentication logic 34 may determine whether the determined height of the user matches the stored height of the user.

If the action authentication logic 34 determines that the distance or movement data matches the physical authentication data, then, in process block 152, the authentication logic 28 authenticates the user. If the action authentication logic 34 determines that the distance or movement data does not match the physical authentication data, then, in process block 154, the processor 16 ends the communication. Such may be the case when a defrauder attempts to perform the movement, but due to a difference in physical characteristics (such as height) with the user, the communication is ended and the financial transaction is not performed.

It should be understood that the movement 172 of touching their head 180 and toes 190 is used as an example, and the method 140 may include instructing the user 130 to perform any suitable movement (e.g., the user touching their head and knee, walking, typing, or speaking), and comparing the movement to any suitable physical characteristic of the user (e.g., the user's walking gait, the typing rhythm, or voice). In this manner, the method 140 may authenticate the user based on user movement, and prevent fraudulent financial transactions from being performed.

Figure 12:
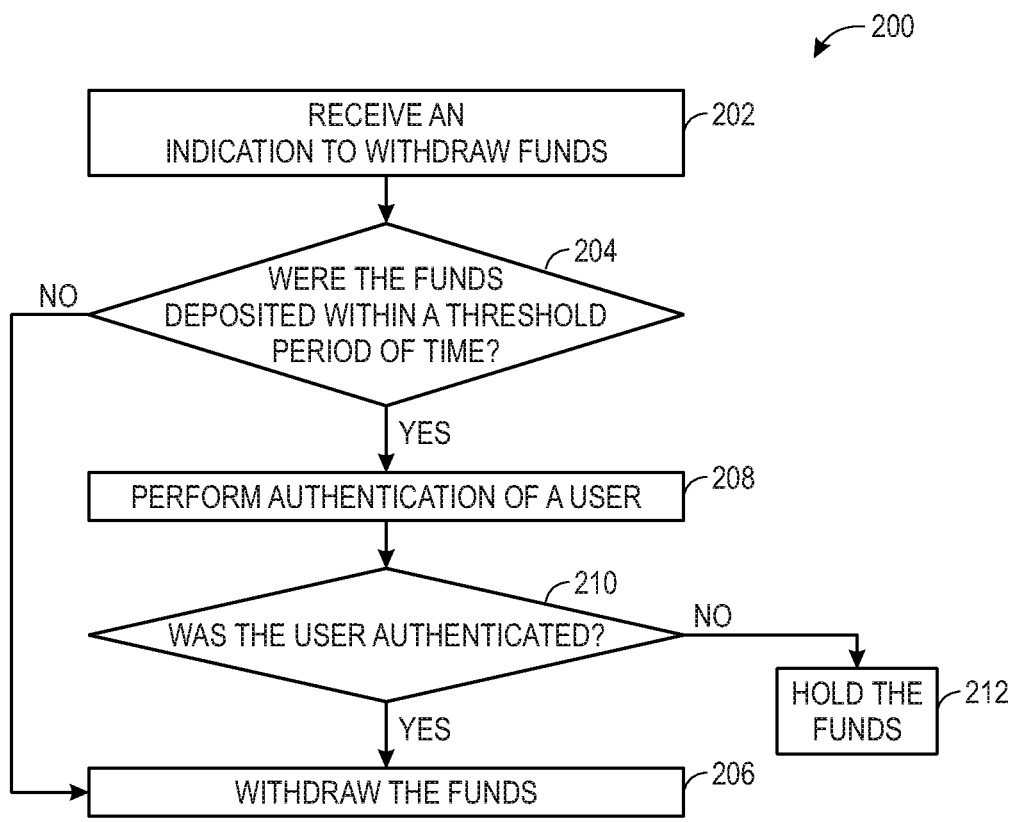
FIG. 12 is a flowchart illustrating a method for authenticating a user to release held funds, according to embodiments of the present disclosure.

As mentioned above, the authentication logic 28 may also perform authentication of the user to bypass situations in which the user's funds are being held or financial institution accounts 26 are frozen. FIG. 12 is a flowchart illustrating a method 200 for authenticating the user to release held funds, according to embodiments of the present disclosure. The method 200 may be performed by any suitable device that may control components of the fraud prevention system 10 of FIG. 1, such as the controller 14, the financial institution server 22, the financial institution logic 20, the authentication logic 28, the action authentication logic 34, the location authentication logic 40, and/or the correlation logic 46. While the method 200 is described using steps in a specific sequence, it should be understood that the present disclosure contemplates that the described steps may be performed in different sequences than the sequence illustrated, and certain described steps may be skipped or not performed altogether. In some embodiments, the method 200 may be implemented by executing instructions stored in a tangible, non-transitory, computer-readable medium, such as the one or more memory devices 18, using a processor, such as the one or more processors 16.

As illustrated, in process block 202, the financial institution logic 20 receives an indication to withdraw funds from a financial institution account 26. For example, the user may desire to purchase goods or services using the funds.

In process block 204, the financial institution logic 20 determines whether the funds were deposited within a threshold period of time. In particular, funds that have been recently deposited in the user's bank account may be held until the threshold period of time has elapsed. The threshold period of time may be any suitable time that the financial institution uses to hold the funds, such as between one hour and one month, one day and one week, or three days.

If financial institution logic 20 determines that the funds were not deposited within the threshold period of time, then, in process block 206, the financial institution logic 20 instructs the financial institution server 22 to withdraw the funds. Such instructions may be issued because the funds were not deposited within the threshold period of time and, as such, the funds should not be held and should be available to be withdrawn.

If the financial institution logic 20 determines that the funds were deposited within the threshold period of time, then, in process block 208, the authentication logic 28 performs authentication of the user. The authentication logic 28 may perform any suitable type of authentication using any suitable sensor 30 or input device 48 of the computing device 12, such as password or credential manual entry, biometric authentication, location authentication, movement-based authentication, physical characteristic authentication, and/or electrical resistance authentication.

In decision block 210, the authentication logic 28 then determines whether the user was authenticated. If so, then, in process block 206, the financial institution logic 20 instructs the financial institution server 22 to withdraw the funds. That is, because the user is authenticated, the financial institution logic 20 determines that the funds may be released and used by the user.

Otherwise, if the authentication logic 28 determines that the user was not authenticated, then, in process block 212, the financial institution server 22 continues holding the funds and does not release them for use. In such a case, this may be because a defrauder attempted to withdraw the funds, but could not be authenticated as the user. In this manner, the method 200 may authenticate the user to release held funds, and prevent fraudulent financial transactions from being performed.

Figure 13:
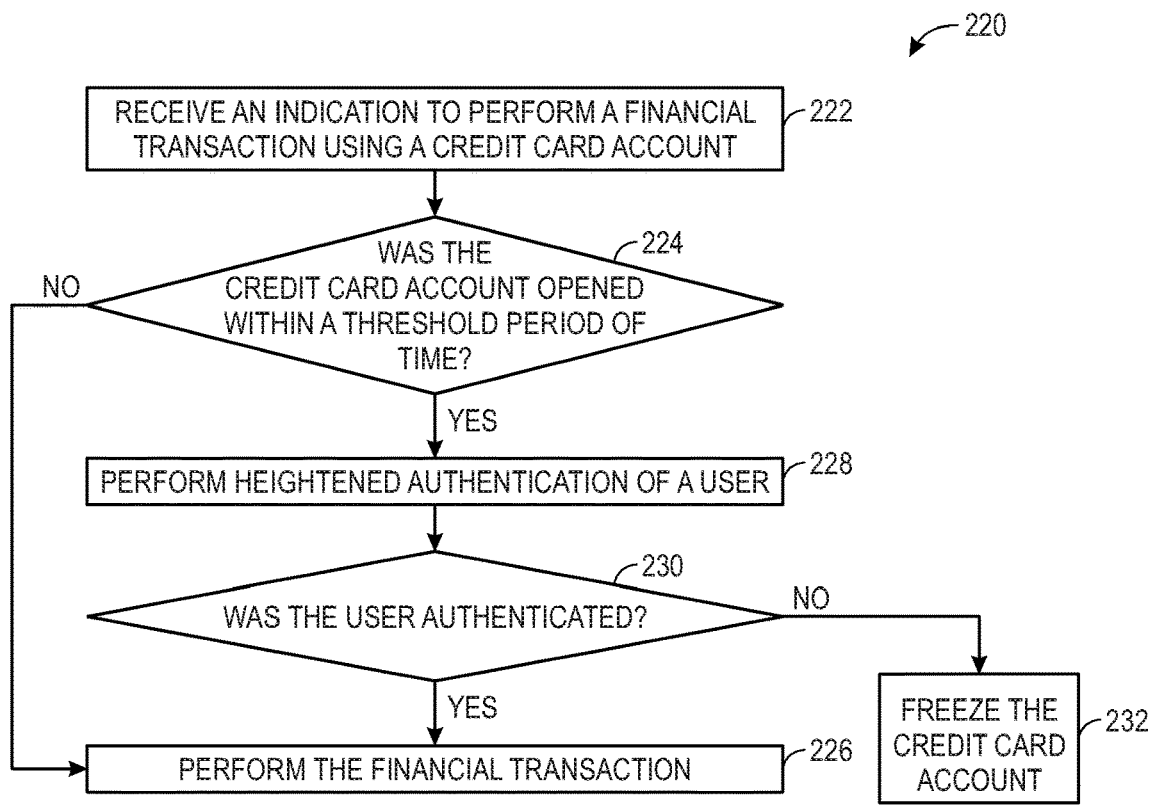
FIG. 13 is a flowchart illustrating a method for authenticating a user to release frozen financial institution accounts, according to embodiments of the present disclosure.

FIG. 13 is a flowchart illustrating a method 220 for authenticating the user to release frozen financial institution accounts 26, according to embodiments of the present disclosure. The method 220 may be performed by any suitable device that may control components of the fraud prevention system 10 of FIG. 1, such as the controller 14, the financial institution server 22, the financial institution logic 20, the authentication logic 28, the action authentication logic 34, the location authentication logic 40, and/or the correlation logic 46. While the method 220 is described using steps in a specific sequence, it should be understood that the present disclosure contemplates that the described steps may be performed in different sequences than the sequence illustrated, and certain described steps may be skipped or not performed altogether. In some embodiments, the method 220 may be implemented by executing instructions stored in a tangible, non-transitory, computer-readable medium, such as the one or more memory devices 18, using a processor, such as the one or more processors 16.

As illustrated, in process block 222, the financial institution logic 20 receives an indication to perform a financial transaction using a credit card account (e.g., a financial institution account 26). For example, the user may desire to purchase goods or services using the credit card account.

In process block 224, the financial institution logic 20 determines whether the credit card account was opened within a threshold period of time. In particular, when the user opens a new credit card account, the new credit card account may be frozen until the threshold period of time has elapsed. The threshold period of time may be any suitable time that the financial institution uses to freeze the credit card account, such as between one hour and one month, one day and one week, or three days.

If the financial institution logic 20 determines that the credit card account was not opened within the threshold period of time, then, in process block 226, the financial institution logic 20 instructs the financial institution server 22 to perform the transaction. That is, because the credit card account was not opened within the threshold period of time, the credit card account should not be frozen and credit should be available to be used to perform the financial transaction.

If the financial institution logic 20 determines that the credit card account was opened within the threshold period of time, then, in process block 228, the authentication logic 28 performs authentication of the user. The authentication logic 28 may perform any suitable type of authentication using any suitable sensor 30 or input device 48 of the computing device 12, such as password or credential manual entry, biometric authentication, location authentication, movement-based authentication, physical characteristic authentication, and/or electrical resistance authentication.

In decision block 230, the authentication logic 28 then determines whether the user was authenticated. If so, then, in process block 226, the financial institution logic 20 instructs the financial institution server 22 to perform the transaction. That is, because the user is authenticated, the financial institution logic 20 determines that the credit card account should be released and credit should be available to be used to perform the financial transaction.

Otherwise, if the authentication logic 28 determines that the user was not authenticated, then, in process block 232, the financial institution server 22 continues freezing the credit card account and does not release it for use. In such a case, this may be because a defrauder attempted to use the credit card account, but could not be authenticated as the user. While a credit card account is used as an example in the method 220, it should be understood that any financial institution account 26 is contemplated, such as a bank account, a credit union account, a savings account, a loan account, an investment account, a brokerage account, an insurance account, or a mortgage account. In this manner, the method 220 may authenticate the user to release frozen financial institution accounts 26, and prevent fraudulent financial transactions from being performed.

Figure 14:
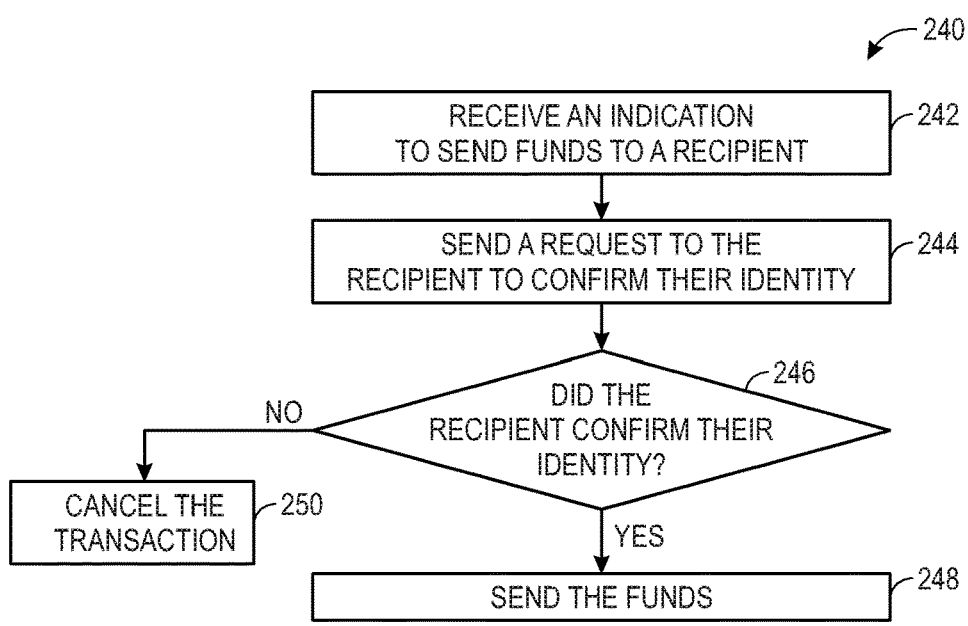
FIG. 14 is a flowchart illustrating a method for authenticating a recipient of funds, according to embodiments of the present disclosure.

The authentication logic 28 may additionally or alternatively enable the user to confirm or authenticate an identity of a recipient of funds (e.g., sent using financial institution logic 20). FIG. 14 is a flowchart illustrating a method 240 for authenticating a recipient of funds, according to embodiments of the present disclosure. The method 240 may be performed by any suitable device that may control components of the fraud prevention system 10 of FIG. 1, such as the controller 14, the financial institution server 22, the financial institution logic 20, the authentication logic 28, the action authentication logic 34, the location authentication logic 40, and/or the correlation logic 46. While the method 240 is described using steps in a specific sequence, it should be understood that the present disclosure contemplates that the described steps may be performed in different sequences than the sequence illustrated, and certain described steps may be skipped or not performed altogether. In some embodiments, the method 240 may be implemented by executing instructions stored in a tangible, non-transitory, computer-readable medium, such as the one or more memory devices 18, using a processor, such as the one or more processors 16.

As illustrated, in process block 242, the financial institution logic 20 receives an indication to send funds to a recipient. For example, the user may desire to pay the recipient money owed from a previous purchase, give the funds to the recipient as a gift, and so on, using the financial institution logic 20. As such, the indication may include a recipient identifier, such as a name, address, phone number, email address, or account name. However, in some cases, the user may be unsure whether the recipient identifier is correct. This may be because the user does not typically use the recipient identifier to contact the recipient (e.g., the recipient identifier is an email address and the user typically communicates with the recipient over the phone or via text message), or the user is afraid that they have made a mistake typing in the recipient identifier.

Thus, in process block 244, the authentication logic 28 sends a request to the recipient to confirm their identity. For example, the authentication logic 28 may send the request using a form of communication that is unrelated to the recipient identifier. That is, if the recipient identifier is the recipient's email address, the authentication logic 28 may send the request using a text message, or vice versa. In this manner, the authentication logic 28 may provide confirmation and assurance to the user that the recipient is indeed the intended recipient. In some embodiments, the authentication logic 28 may perform any suitable type of authentication, such as password or credential manual entry, biometric authentication, location authentication, movement-based authentication, physical characteristic authentication, and/or electrical resistance authentication, to further confirm that the recipient is the intended recipient.

In decision block 246, the authentication logic 28 determines whether the recipient confirmed their identity. In particular, the authentication logic 28 may determine that the recipient confirmed their identity if a return message is received from the recipient via the same form of communication that the request for confirmation in process block 244 was sent. For example, if the authentication logic 28 sent a request to the recipient to confirm their identity in the form of a text message, the authentication logic 28 may determine that the recipient confirmed their identity if a return text message from the recipient was received. In some embodiments, the request to the recipient to confirm their identity may include a question (e.g., "what day of the week is today?"), and if the recipient answers correctly, then the authentication logic 28 determined that the recipient confirmed their identity, then, in process block 248, the financial institution logic 20 sends the funds to the recipient. If the authentication logic 28 attempted to authenticate the recipient, then the authentication logic 28 may determine that the recipient confirmed their identity if the recipient was authenticated.

If the authentication logic 28 determined that the recipient confirmed their identity, then, in process block 248, the financial institution logic 20 sends the funds to the recipient. If the authentication logic 28 determined that the recipient did not confirm their identity (e.g., by not responding in a threshold period of time, by providing the wrong response, or by not being authenticated), then, in process block 250, the financial institution logic 20 cancels the transaction. In this manner, the method 240 enables the user to confirm or authenticate an identity of a recipient of funds, and thus may decrease or prevent fraudulent financial transactions.

It should be understood that any of the methods, 100 of FIG. 5, 140 of FIG. 8, 200 of FIG. 12, 220 of FIG. 13, or 240 of FIG. 14, may be combined with one or more of the other methods. In some cases, steps of the methods 100, 140, 200, 220, 240 may be added or removed between the methods to facilitate authenticating a user.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. One or more non-transitory, tangible, computer-readable media comprising instructions that, when executed by one or more processors of an electronic device, cause the one or more processors to:
   output, via the electronic device, an indication of an action for a user to perform, wherein the action comprises touching the electronic device to a head of the user and touching the electronic device to toes of the user;
   receive distance data or movement data from one or more sensors of the electronic device in response to the indication; and
   authenticate the user based on a determination that the distance data or the movement data correlates to one or more quantifiable physical characteristics of the user, wherein the one or more quantifiable physical characteristics comprises a height of the user.

2. The one or more non-transitory, tangible, computer-readable media of claim 1, wherein the instructions cause the one or more processors to:

determine an estimated height of the user based on the distance data or the movement data; and authenticate the user at least in response to determining that the estimated height of the user correlates to the height of the user.

3. The one or more non-transitory, tangible, computer-readable media of claim 1, wherein the instructions, when executed by the one or more processors, cause the one or more processors to confirm performance of the action based on at least one image captured by the electronic device.

4. The one or more non-transitory, tangible, computer-readable media of claim 1, wherein the action for the user to perform comprises extending the electronic device in front of the user and touching the electronic device to a shoulder of the user, and wherein the one or more quantifiable physical characteristics data comprises an arm length of the user.

5. The one or more non-transitory, tangible, computer-readable media of claim 1, wherein the distance data or the movement data comprises a distance traveled by the electronic device.

6. A computing device comprising:
an electronic display;
one or more sensors;
one or more processors; and
one or more memory devices configured to store instructions that, when executed by the one or more processors, cause the one or more processors to:
display, via the electronic display, an indication of an action for a user to perform, wherein the action comprises touching the computing device to a head of the user and touching the computing device to toes of the user;
receive distance data or movement data from the one or more sensors in response to the indication; and
authenticate the user based on the distance data or the movement data correlating to at least one of a height of the user and an arm length of the user.

7. The computing device of claim 6, wherein the instructions, when executed by the one or more processors, cause the one or more processors to:
determine an estimated height of the user based on the distance data or the movement data; and
authenticate the user at least in response to determining that the estimated height of the user correlates to the height of the user.

8. The computing device of claim 6, wherein the instructions, when executed by the one or more processors, cause the one or more processors to confirm performance of the action based on at least one image captured by the computing device.

9. The computing device of claim 6, wherein the action for the user to perform comprises extending the computing device in front of the user and touching the computing device to a shoulder of the user.

10. The computing device of claim 6, wherein the one or more sensors comprise at least one of an accelerometer, a gyroscope, or a magnetometer.

11. A method comprising:
outputting an indication of an action for a user to perform via an electronic device, wherein the action comprises touching the electronic device to a head of the user and touching the electronic device to toes of the user;
receiving distance data or movement data from one or more sensors of the electronic device in response to the indication;
performing a comparison of the distance data or the movement data to one or more stored physical characteristics of the user, wherein the one or more stored physical characteristics comprise a height of the user; and
authenticating, via one or more processor of the electronic device, the user based on the comparison.

12. The method of claim 11, comprising:
determining, via the one or more processor, an estimated height of the user based on the distance data or the movement data; and
authenticating, via the one or more processor, the user at least in response to determining that the estimated height of the user correlates to the height of the user.

13. The method of claim 11, comprising capturing, via the electronic device, at least one image to confirm performance of the action.

14. The method of claim 11, comprising:
establishing, via the one or more processor, communication between the electronic device and a financial institution; and
ending, via the one or more processor, the communication based on the distance data or the movement data not correlating to the one or more stored physical characteristics of the user.

* * * * *